United States Patent
Ritchey et al.

(10) Patent No.: US 11,856,884 B2
(45) Date of Patent: Jan. 2, 2024

(54) AGRICULTURAL HEADER WITH SWATH GATE FOR SPREADING AND CONVERGING CROP MATERIAL

(71) Applicant: CNH Industrial America LLC, New Holland, PA (US)

(72) Inventors: Frederick Ritchey, New Holland, PA (US); Jeffrey B. Fay, II, Oxford, PA (US); Scott Wangsgard, Weston, ID (US); Terry S. Moyer, Denver, PA (US); Kevin Cordes, Glenmoore, PA (US); Jeffrey A. Eavenson, New Holland, PA (US); Garin R. Ingalls, Lititz, PA (US)

(73) Assignee: CNH Industrial America LLC, New Holland, PA (US)

(*) Notice: Subject to any disclaimer, the term of this patent is extended or adjusted under 35 U.S.C. 154(b) by 286 days.

(21) Appl. No.: 17/226,548

(22) Filed: Apr. 9, 2021

(65) Prior Publication Data
US 2022/0322605 A1  Oct. 13, 2022

(51) Int. Cl.
*A01D 34/66* (2006.01)
*A01D 41/12* (2006.01)
*A01D 43/10* (2006.01)

(52) U.S. Cl.
CPC ....... *A01D 34/667* (2013.01); *A01D 41/1243* (2013.01); *A01D 43/10* (2013.01)

(58) Field of Classification Search
CPC ... A01D 41/1243; A01D 43/10; A01D 34/667
See application file for complete search history.

(56) References Cited

U.S. PATENT DOCUMENTS

| | | | |
|---|---|---|---|
| 3,721,073 A | | 3/1973 | Scarnato et al. |
| 4,099,364 A | | 7/1978 | Kanengieter et al. |
| 4,217,746 A | | 8/1980 | Cicci et al. |
| 5,930,988 A | * | 8/1999 | Hanson ............. A01D 82/00 56/192 |
| 6,158,201 A | * | 12/2000 | Pruitt ............... A01D 43/10 56/157 |

(Continued)

FOREIGN PATENT DOCUMENTS

EP  1 310 149 A1  5/2003

OTHER PUBLICATIONS

Extended European Search Report for EP Application No. 22159850.1 dated Sep. 2, 2022 (nine pages).

*Primary Examiner* — Thomas B Will
*Assistant Examiner* — Julia C Tran
(74) *Attorney, Agent, or Firm* — Peter K. Zacharias

(57) ABSTRACT

A header includes: a header frame; a cutter carried by the header frame; a roll disposed rearwardly of the cutter and configured to convey cut crop material rearwardly in a crop flow stream; a swath gate coupled to the header frame and movable between a spreading position and a converging position; a spreader coupled to the swath gate and configured to laterally spread the crop flow stream as the crop flow stream flows across the spreader; and a converger coupled to the swath gate and configured to converge the crop flow stream toward a centerline of the swath gate as the crop flow stream flows across the converger. The spreader and the converger are configured to not be in the crop flow stream at the same time, depending on the position of the swath gate.

20 Claims, 6 Drawing Sheets

(56) References Cited

U.S. PATENT DOCUMENTS

| | | | |
|---|---|---|---|
| 6,854,251 B2 * | 2/2005 | Snider | A01D 57/26 |
| | | | 56/192 |
| 6,939,221 B1 | 9/2005 | Redekop et al. | |
| 7,059,108 B1 * | 6/2006 | Rosenbalm | A01D 82/00 |
| | | | 56/16.4 R |
| 7,220,179 B2 | 5/2007 | Redekop et al. | |
| 7,559,833 B2 * | 7/2009 | Isaac | A01D 41/1243 |
| | | | 460/111 |
| 7,736,218 B2 * | 6/2010 | Mayerle | A01D 41/1243 |
| | | | 460/112 |
| 8,430,732 B1 | 4/2013 | Totten et al. | |
| 8,833,046 B2 * | 9/2014 | Barnett | A01D 43/10 |
| | | | 56/157 |
| 9,591,804 B2 | 3/2017 | Issac et al. | |
| 10,212,882 B2 * | 2/2019 | Mayerle | A01D 41/1243 |
| 11,259,465 B2 * | 3/2022 | Nichols | A01D 89/002 |
| 2006/0246965 A1 * | 11/2006 | Lauer | A01D 41/1243 |
| | | | 460/111 |
| 2011/0302897 A1 | 12/2011 | Hoffman et al. | |
| 2012/0270613 A1 * | 10/2012 | Isaac | A01F 12/40 |
| | | | 460/111 |
| 2013/0102370 A1 | 4/2013 | Totten et al. | |
| 2015/0011276 A1 * | 1/2015 | Murray | A01F 12/00 |
| | | | 460/111 |

* cited by examiner

AGRICULTURAL HEADER WITH SWATH GATE FOR SPREADING AND CONVERGING CROP MATERIAL

FIELD OF THE INVENTION

The present invention pertains to agricultural vehicles and, more specifically, to a header for an agricultural vehicle.

BACKGROUND OF THE INVENTION

Agricultural vehicles, such as mower-conditioners, using counter-rotating disc cutters tend to cause the flow of cut crop material discharged from the mower-conditioner to be concentrated in streams of crop generally centered behind pairs of converging-rotation discs. Such concentrations of crop flow are less problematic when the cut crop material is being gathered into windrows on the ground. However, in some instances it is desirable to uniformly disperse crop material behind the mower to enhance drying rather than to gather the crop material into a windrow. This approach is especially beneficial when harvesting green crops with higher moisture content, typically around 80%.

What is needed in the art is a way to both concentrate and spread cut crop material.

SUMMARY OF THE INVENTION

Exemplary embodiments provided according to the present disclosure provide a swath gate that is movable between a spreading position and a converging position, a spreader coupled to the swath gate and configured to spread a crop flow stream when the swath gate is in the spreading position, and a converger coupled to the swath gate and configured to converge the crop flow stream when the swath gate is in the converging position.

In some exemplary embodiments provided according to the present disclosure, a header for an agricultural vehicle includes: a header frame; a cutter carried by the header frame and configured to cut crop material; at least one roll disposed rearwardly of the cutter and configured to convey cut crop material rearwardly in a crop flow stream; a swath gate coupled to the header frame and movable between a spreading position and a converging position; a spreader coupled to the swath gate and configured to laterally spread the crop flow stream as the crop flow stream flows across the spreader, the spreader being in the crop flow stream when the swath gate is in the spreading position and out of the crop flow stream when the swath gate is in the converging position; and a converger coupled to the swath gate and configured to converge the crop flow stream toward a centerline of the swath gate as the crop flow stream flows across the converger, the converger being in the crop flow stream when the swath gate is in the converging position and out of the crop flow stream when the swath gate is in the spreading position.

In some exemplary embodiments provided according to the present disclosure, an agricultural vehicle includes a chassis and a header carried by the chassis. The header includes: a header frame; a cutter carried by the header frame and configured to cut crop material; at least one roll disposed rearwardly of the cutter and configured to convey cut crop material rearwardly in a crop flow stream; a swath gate coupled to the header frame and movable between a spreading position and a converging position; a spreader coupled to the swath gate and configured to laterally spread the crop flow stream as the crop flow stream flows across the spreader, the spreader being in the crop flow stream when the swath gate is in the spreading position and out of the crop flow stream when the swath gate is in the converging position; and a converger coupled to the swath gate and configured to converge the crop flow stream toward a centerline of the swath gate as the crop flow stream flows across the converger, the converger being in the crop flow stream when the swath gate is in the converging position and out of the crop flow stream when the swath gate is in the spreading position.

One possible advantage that may be realized by exemplary embodiments provided according to the present disclosure is that the spreader and the converger can perform their respective functions without interfering with one another, depending on the position of the swath gate.

Another possible advantage that may be realized by exemplary embodiments provided according to the present disclosure is that the spreader and the converger can be moved into and out of engagement with the crop flow stream by moving just the swath gate, which can reduce the number of parts and associated cost.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
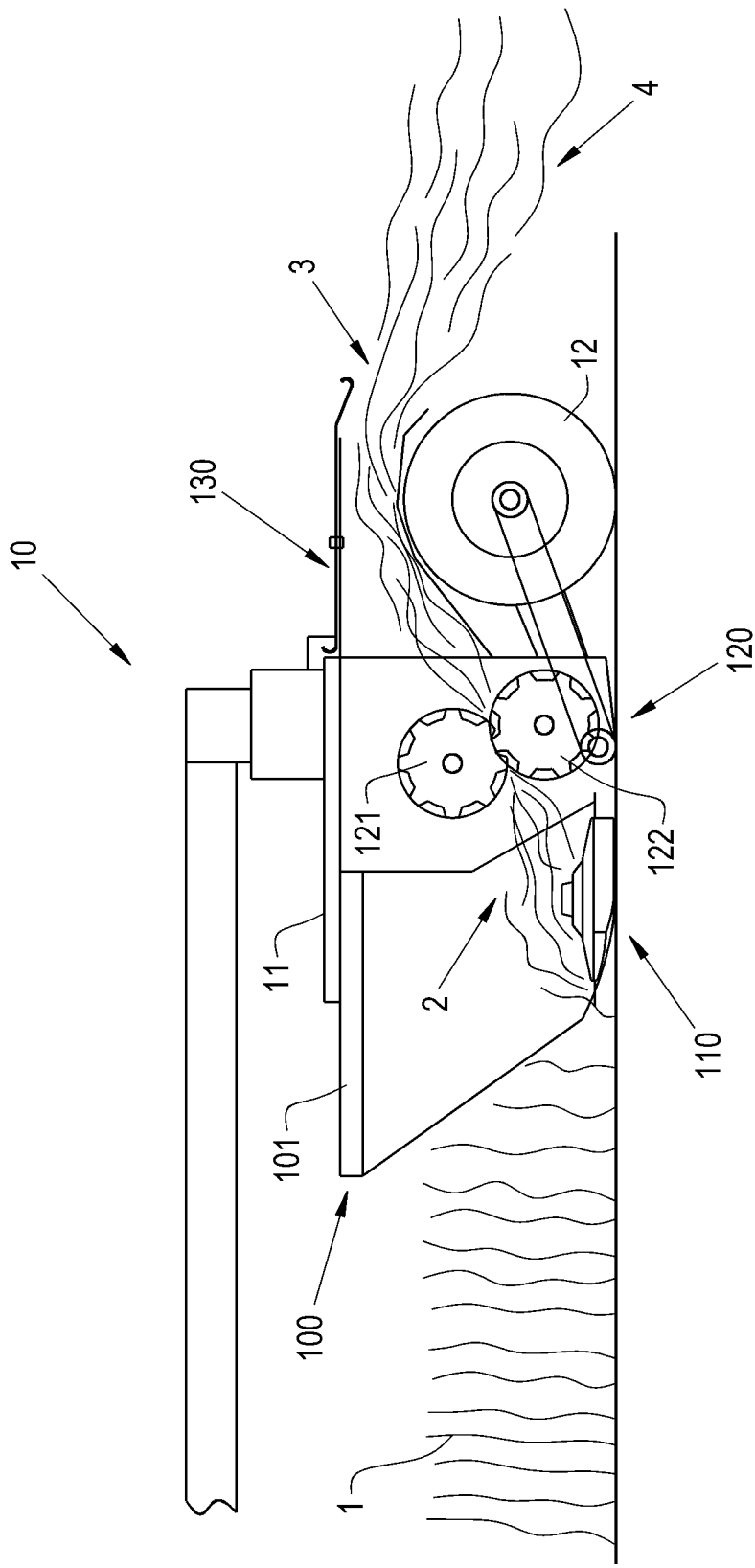
FIG. 1 illustrates a side view of an exemplary embodiment of an agricultural vehicle carrying a header, in accordance with an exemplary embodiment of the present invention.
Figure 2:
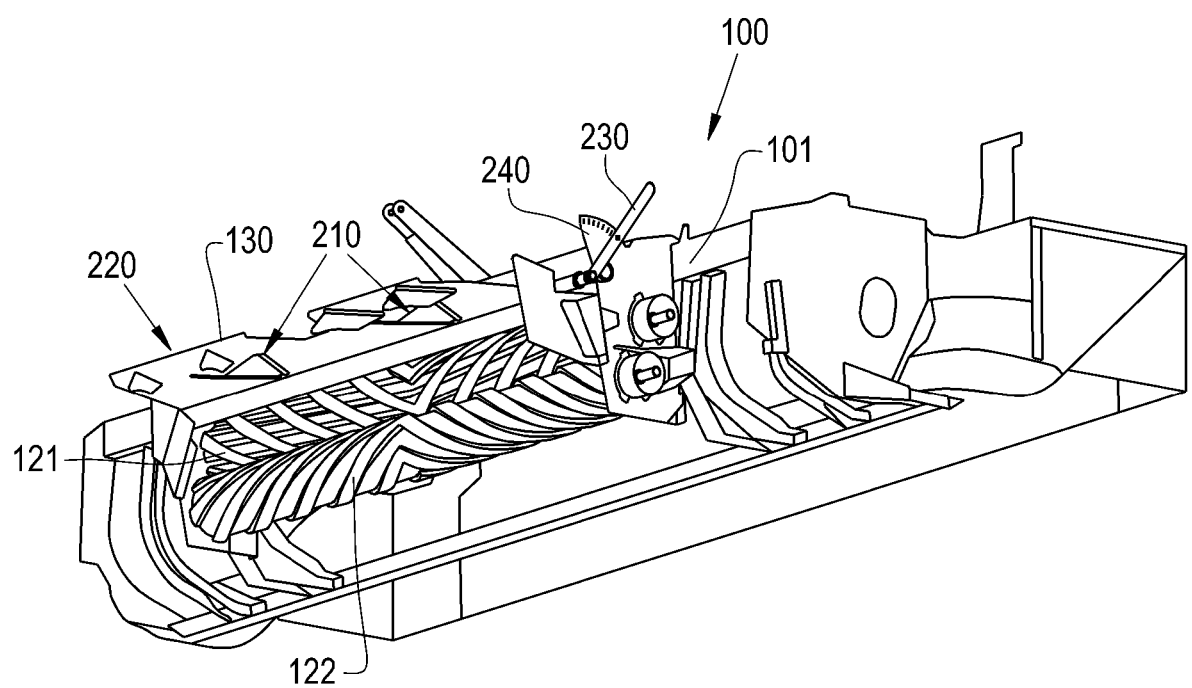
FIG. 2 illustrates a perspective view of the header of the agricultural vehicle of FIG. 1, in accordance with an exemplary embodiment of the present invention.

Referring now to the drawings, FIG. 1 shows an exemplary embodiment of an agricultural vehicle, illustrated in the form of a pull-behind agricultural mower-conditioner 10, used for cutting and conditioning a standing crop 1 as it travels forwardly across the ground. The mower-conditioner 10 includes a chassis 11 supporting various components of the mower-conditioner 10, which is operably connected to a tractor (not shown) and supported by a pair of trailing wheels 12. The crop 1 is severed from the ground by a header 100 including a header frame 101 supporting one or more transversely disposed cutters 110, illustrated in the form of rotary disc cutter modules arranged so adjacent pairs of modules counter-rotate, whereupon it is directed toward and engaged by a conditioning mechanism 120. Adjacent pairs of the cutters 110 rotate so that the cutters converge crop material therebetween while other adjacent pairs divergingly rotate so that cut crop is directed away from the space between the cutters 110. Consequently, the crop material being directed toward the conditioning mechanism 120 is concentrated into a number of crop streams 2 generally centered between pairs of convergingly rotating disc cutters 120 and less dense in the area downstream of divergingly rotating disc cutters 110.

The conditioning mechanism 120 includes at least one roll, illustrated as a pair of transversely elongate conditioning rolls 121, 122 as shown, or it may comprise a flail-type conditioner in which crop passes between a single roll with radially arranged flails and a closely proximate adjacent surface in order to crush the crop material. Rolls 121, 122, which may also be referred to as a first roll 121 and a second roll 122, may be cylindrical and closely spaced apart on parallel, transverse axes such that a crop flow gap is created therebetween through which crop material passes. The crop material is then ejected rearwardly from the rolls 121, 122 in a plurality of airborne streams 3 along a trajectory whereupon it falls to the ground in a mat 4. A swath gate 130 is provided to allow alteration of the crop trajectory and thereby control the configuration of the resultant mat 4 of crop material on the ground behind the mower-conditioner 10. While the agricultural vehicle 10 is illustrated and described in the form of a mower-conditioner, it should be appreciated that the agricultural vehicle 10 can be provided as different types of vehicles according to the present disclosure, including but not limited to windrowers, spreaders, and windrow inverters.

Movement of the crop material through the conditioning mechanism 120 typically does little to laterally redistribute the individual streams 3 of crop material, thus the mat 4 of crop material deposited on the ground would be of non-uniform density without additional crop movement guides. Further, it has been found that known mower-conditioners may not effectively converge the cut crop material into a windrow, which can make subsequent collection of the crop material difficult.

Figure 3:
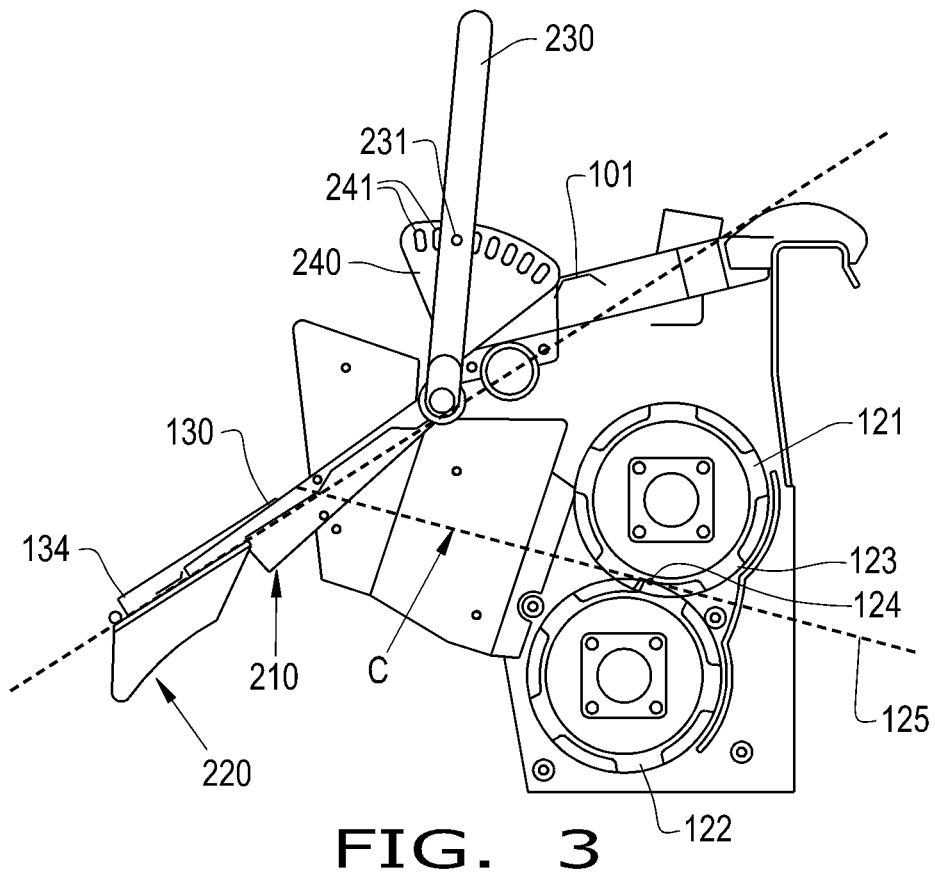
FIG. 3 illustrates the header of FIGS. 1-2 with a swath gate that is in a spreading position, in accordance with an exemplary embodiment of the present invention.
Figure 4:
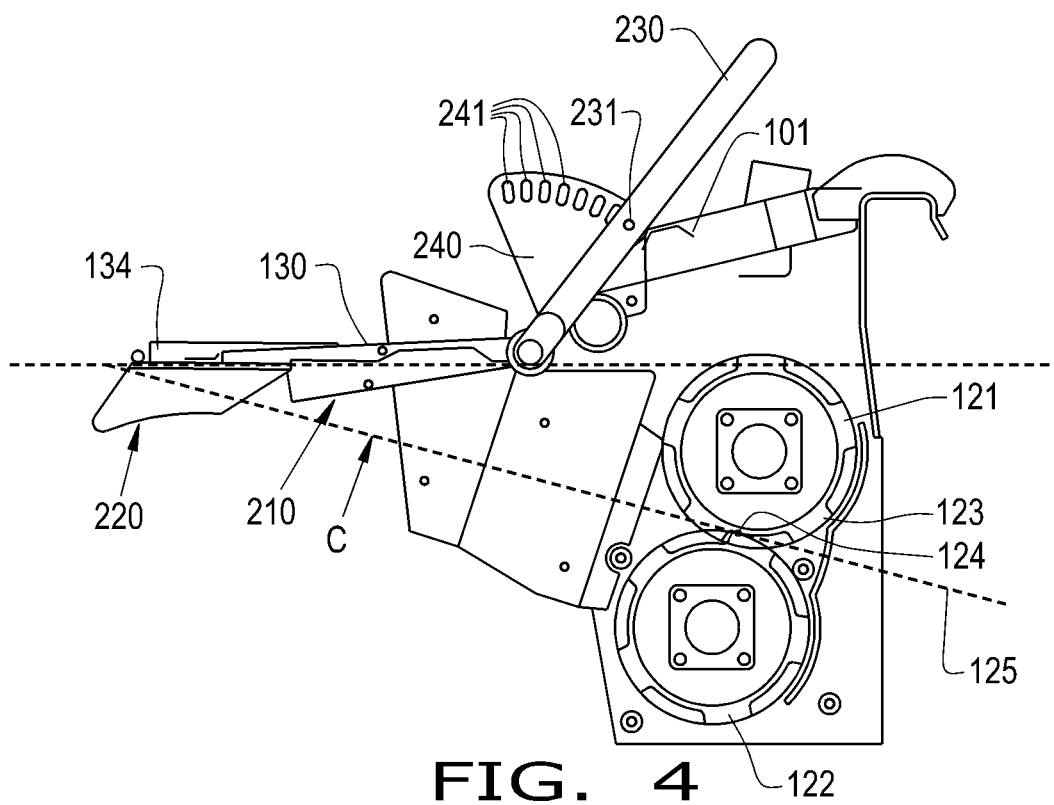
FIG. 4 illustrates the header of FIGS. 1-3 with the swath gate in a converging position, in accordance with an exemplary embodiment of the present invention.

To address some of the previously described issues with known agricultural vehicles, and referring now to FIGS. 2-6, the swath gate 130 is coupled to the header frame 101 and movable between a spreading position (illustrated in FIG. 3) and a converging position (illustrated in FIG. 4). The header 100 also includes a spreader 210 coupled to the swath gate 130 that is configured to laterally spread a crop flow stream C as the crop flow stream C flows across the spreader 210 and a converger 220 coupled to the swath gate 130 that is configured to converge the crop flow stream C toward a centerline 131 of the swath gate 130 as the crop flow stream C flows across the converger 220. While reference is made further herein to "the spreader 210" and "the converger 220," it should be appreciated that multiple spreaders 210 and convergers 220, i.e., a plurality of spreaders 210 and a plurality of convergers 220, may be provided according to the present disclosure, as illustrated. As can be appreciated from FIG. 3, the spreader 210 is in the crop flow stream C when the swath gate 130 is in the spreading position, i.e., the crop flow stream C flows across the spreader 210 when the swath gate 130 is in the spreading position, while the converger 220 is out of the crop flow stream C when the swath gate 130 is in the spreading position, i.e., the crop flow stream C generally does not flow across the converger 220 when the swath gate 130 is in the spreading position. Similarly, as can be appreciated from FIG. 4, the converger 220 is in the crop flow stream C when the swath gate 130 is in the converging position, i.e., the crop flow stream C flows across the converger 220 when the swath gate 130 is in the converging position, while the spreader 210 is out of the crop flow stream C when the swath gate 130 is in the converging position, i.e., the crop flow stream C generally does not flow across the spreader 210 when the swath gate 130 is in the converging position. As used herein, the spreader 210 and the converger 220 are each considered to be "out of the crop flow stream C" if 30% or less of the crop material of the crop flow stream C flows across the spreader 210 or the converger 220, e.g., the spreader 210 is out of the crop flow stream if 30% or less of the crop material of the crop flow stream C flows across the spreader 210. In this respect, the spreader 210 is in a position to laterally spread the crop flow stream C when the swath gate 130 is in the spreading position while the converger 220 is in a position to converge the crop flow stream C toward the centerline 131 of the swath gate 130 when the swath gate 130 is in the converging position.

As illustrated, the swath gate 130 may be pivotably coupled to the header frame 101 and adjustable by moving a lever 230 that is coupled to the swath gate 130. The lever 230 may include a set pin 231 that can be disposed in slots 241 of a gate wedge 240 to adjust the angular position of the lever 230, and the coupled swath gate 130, with respect to the header frame 101. It should be appreciated that the swath gate 130 may be movable in other ways, e.g., without being pivotably coupled to the header frame 101, and may be moved by an actuator, such as a hydraulic cylinder.

In some embodiments, the spreader 210 and the converger 220 are both carried by the swath gate 130 so movement of the swath gate 130 between the spreading position and the converging position carries the spreader 210 and the converger 220 to different positions. The swath gate 130 may include a gate surface 132, with the spreader 210 and the converger 220 both coupled to the gate surface 132 so the spreader 210 and the converger 220 are carried by the swath gate 130. The swath gate 130 has a front edge 133 and a rear edge 134 opposite the front edge 133. The front edge 133 may be closer to the first roll 121 and the second roll 122, and thus may also be referred to as a "leading edge," with respect to the crop flow stream C. As can be appreciated from FIGS. 3-4, the rear edge 134 of the swath gate 130 may be elevated in the converging position (FIG. 4) relative to the spreading position (FIG. 3). In some embodiments, the converger 220 is disposed rearwardly of the spreader 210, i.e., closer to the rear edge 134 of the swath gate 130, so the converger 220 is in the crop flow stream C when the rear edge 134 is elevated in the converging position. However, it should be appreciated that the converger 220 may also be disposed in front of the spreader 210, i.e., closer to the front edge 133 of the swath gate 130, according to the present disclosure.

As previously described, when a first roll 121 and a second roll 122 are provided, the first roll 121 and the second roll 122 may be spaced apart to define a crop flow gap therebetween and each be a cylindrical roll. The first roll 121 may have a surface 123 defining a closest point 124 (illustrated in FIGS. 3-4) to the second roll 122. A tangent line 125 may be defined through the point 124 and generally approximate the crop flow stream C. The tangent line 125 may extend through the spreader 210 when the swath gate 130 is in the spreading position (FIG. 3) and extend through the converger 220 when the swath gate 130 is in the converging position (FIG. 4). In such an embodiment, the tangent line 125 does not extend through the spreader 210 when the swath gate 130 is in the converging position and does not extend through the converger 220 when the swath gate 130 is in the spreading position. In this respect, the spreader 210 and the converger 220 may be positioned with respect to the point 124 and associated tangent line 125 so the crop flow stream C generally will not be directed at the spreader 210 when the swath gate 130 is in the converging position and will not be directed at the converger 220 when the swath gate 130 is in the spreading position.

Figure 5:
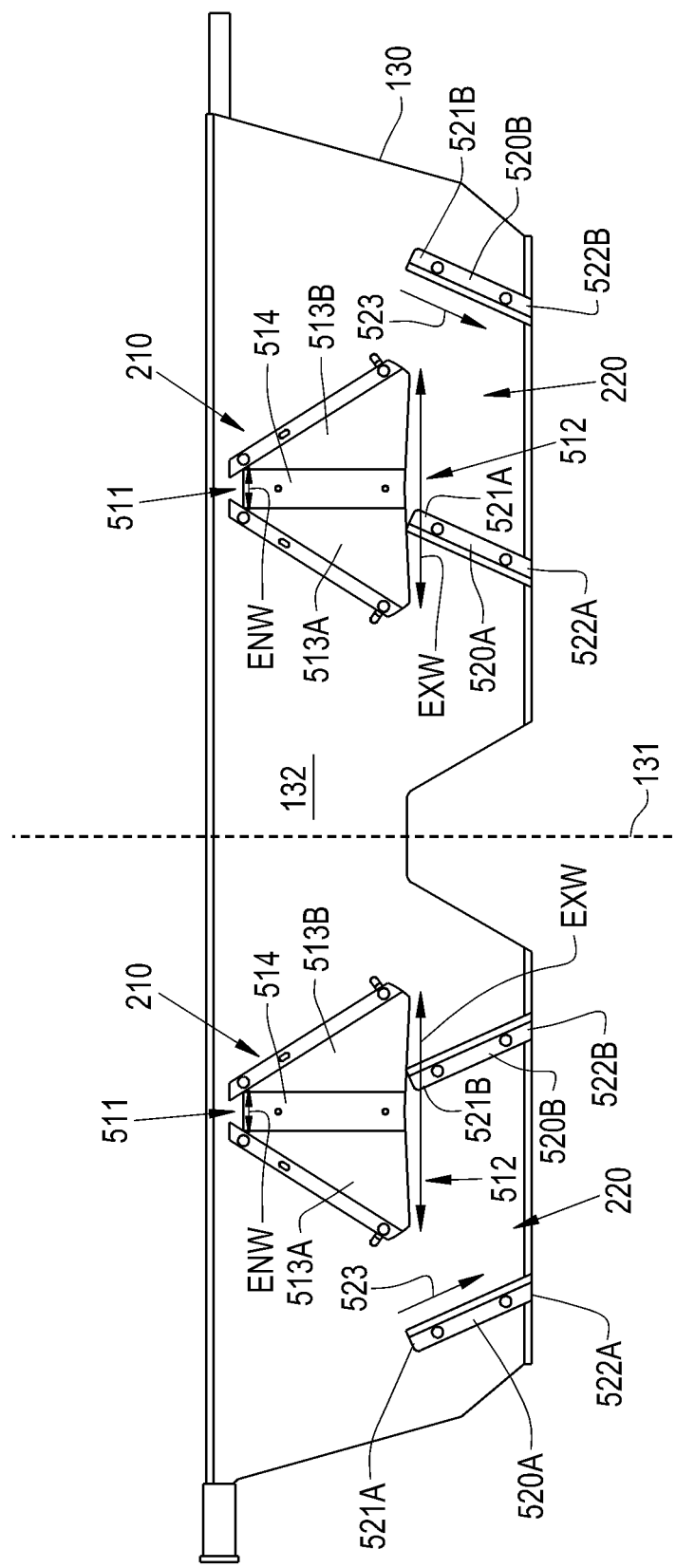
FIG. 5 illustrates a bottom view of the swath gate of the header of FIGS. 1-4 apart from the header frame, in accordance with an exemplary embodiment of the present invention.
Figure 6:
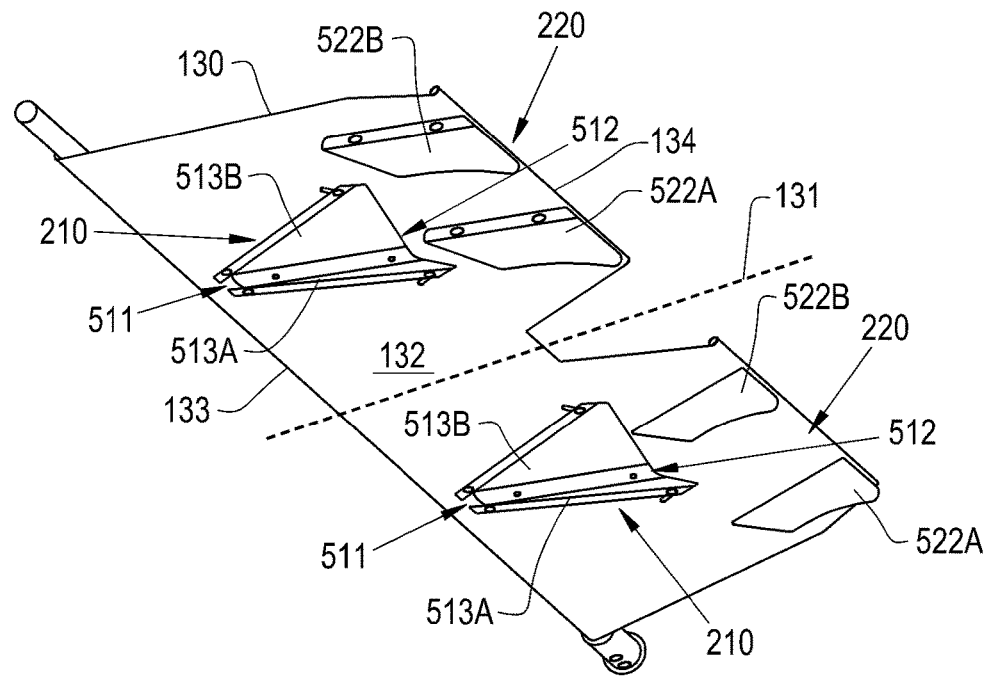
FIG. 6 illustrates a perspective view of the swath gate of FIG. 5.

Referring specifically now to FIGS. 5-6, the spreader(s) 210 and the converger(s) 220 are illustrated in greater detail. As illustrated, the spreader 210 may comprise a wedge having an entry 511 and an exit 512 that is disposed rearwardly from the entry 511. The entry 511 and the exit 512 may be formed between two side sheets 513A, 513B that are joined to a base 514 that is coupled to the gate surface 132 of the swath gate 130. The entry 511 may define an entry width ENW and the exit 512 may define an exit width EXW that is greater than the entry width ENW so the crop flow stream C laterally spreads as it flows rearwardly across the spreader 210 from the entry 511 toward the exit 512. As illustrated, multiple spreaders 210 may be coupled to the swath gate 130.

With further reference to FIGS. 5-6, it is illustrated that the convergers 220 can comprise at least one fin, illustrated as pairs of fins 520A, 520B, with each fin having a respective front edge 521A, 521B and a respective rear edge 522A, 522B. The fins 520A, 520B are directed toward the centerline 131 of the swath gate 130 in a direction 523 from the front edge 521A, 521B to the rear edge 522A, 522B so the crop flow stream C flowing across the fins 520A, 520B is converged toward the centerline 131 of the swath gate 130 as the crop flow stream C flows across the fins 520A, 520B.

Figure 7:
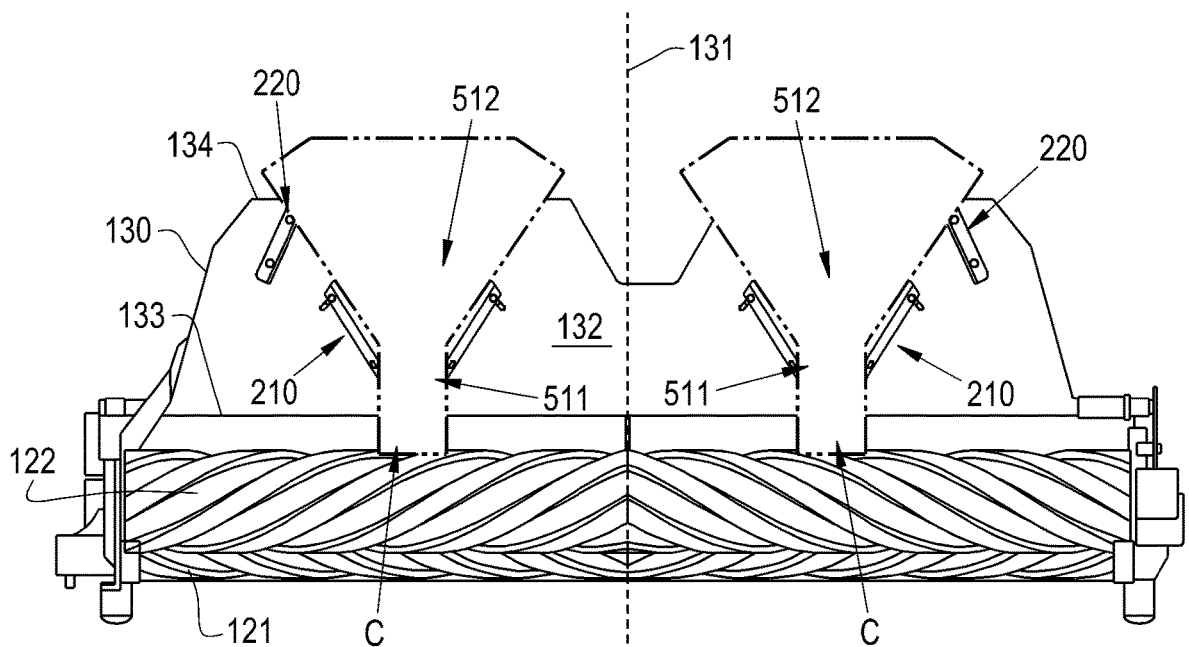
FIG. 7 illustrates the swath gate of the header of FIGS. 1-4 in the spreading position and a crop flow stream flowing across spreaders.
Figure 8:
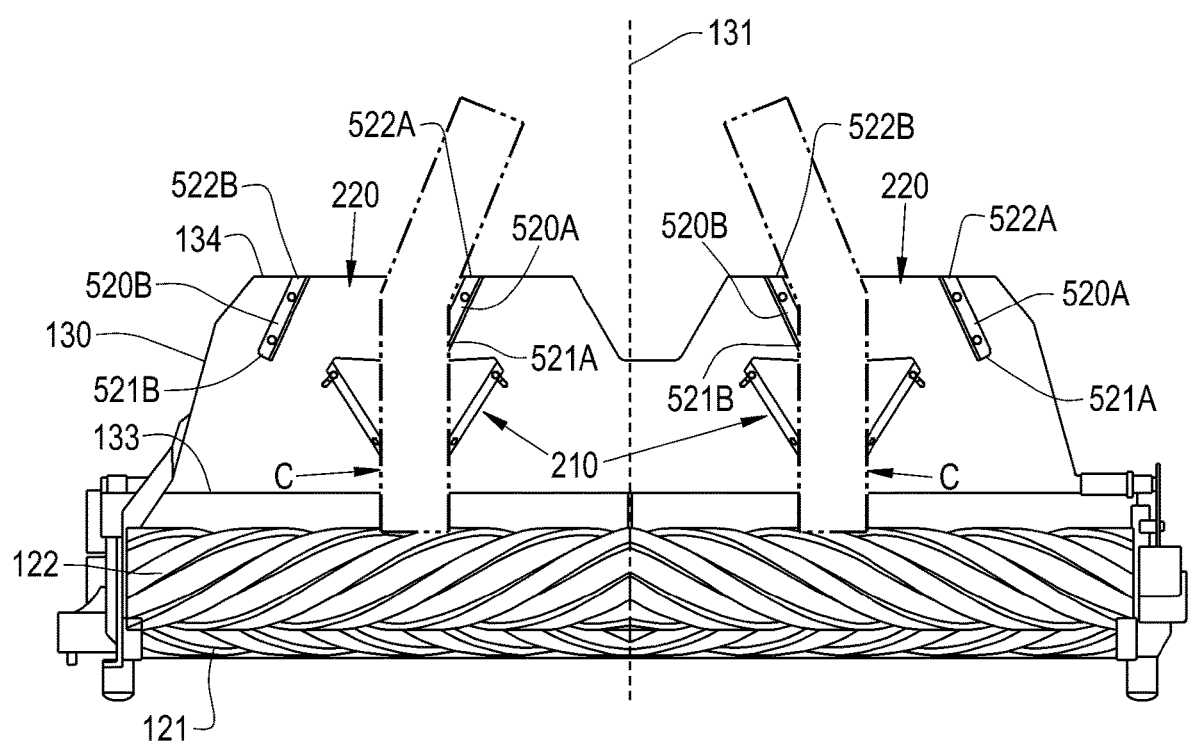
FIG. 8 illustrates the swath gate of the header of FIGS. 1-4 and 7 in the converging position and the crop flow stream flowing across convergers.

Referring now to FIGS. 7-8, it is illustrated how the crop flow stream C can be spread by the spreaders 210 when the swath gate 130 is in the spreading position and converged toward the centerline 131 by the convergers 220 when the swath gate 130 is in the converging position. As illustrated in FIG. 7, when the swath gate 130 is in the spreading position, the crop flow stream C from the rolls 121, 122 flows rearwardly and across the spreaders 210. The crop flow stream C is directed into the entry 511 of the spreaders 210 and spreads out as the spreaders 210 widen from the entry 511 to the exit 512. In this respect, the crop flow stream C is allowed to laterally spread as the crop flow stream C flows across the spreaders 210. When the convergers 220 are out of the crop flow stream C, as illustrated in FIG. 7, the crop flow stream C flows past the convergers 220 without generally flowing across the convergers 220 and thus does not get converged toward the centerline 131.

As illustrated in FIG. 8, when the swath gate 130 is in the converging position, the crop flow stream C from the rolls 121, 122 flows past the spreaders 210 without contacting the spreaders 210 and instead flows across the convergers 220. The crop flow stream C flows across the front edge 521A, 521B of the convergers 220 toward the rear edge 522A, 522B of the convergers 220 to converge toward the centerline 131 of the swath gate 130. In this respect, the swath gate 130 can be moved between the spreading position and the converging position to either laterally spread the crop flow stream C or converge the crop flow stream C toward the centerline 131.

From the foregoing, it should be appreciated that the swath gate 130 provided according to the present disclosure with the spreaders 210 and the convergers 220 can be moved between a spreading position to laterally spread the crop flow stream C and a converging position to converge the crop flow stream C toward the centerline 131. In this respect, the spreading or converging behavior of the crop flow stream C can be controlled by just moving the swath gate 130, which simplifies the process of switching between spreading and converging the crop flow stream C. Controlling the flow behavior of the crop flow stream C can be further simplified by having the swath gate 130 carry the spreaders 210 and convergers 220, which can reduce the complexity and cost of the system. It should thus be appreciated that the header 100 provided according to the present disclosure allows a convenient way to control the flow behavior of the crop flow stream C that allows spreading or converging of the crop flow stream C depending on the position of the swath gate 130.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for an agricultural vehicle, comprising:
a header frame;
a cutter carried by the header frame and configured to cut crop material;
at least one roll disposed rearwardly of the cutter and configured to convey cut crop material rearwardly in a crop flow stream;
a swath gate coupled to the header frame and movable between a spreading position and a converging position, wherein the swath gate comprises a plate having a front edge and a rear edge, wherein the rear edge is elevated in the converging position relative to the spreading position;
a spreader coupled to the swath gate and configured to laterally spread the crop flow stream as the crop flow stream flows across the spreader, the spreader being in the crop flow stream when the swath gate is in the spreading position and out of the crop flow stream when the swath gate is in the converging position; and
a converger coupled to the swath gate and configured to converge the crop flow stream toward a centerline of the swath gate as the crop flow stream flows across the converger, the converger being in the crop flow stream when the swath gate is in the converging position and out of the crop flow stream when the swath gate is in the spreading position,
wherein the spreader and the converger both move together with the swath gate between the spreading position and the converging position.

2. The header of claim 1, wherein the spreader and the converger are both carried by the swath gate.

3. The header of claim 2, wherein the converger is disposed rearwardly of the spreader.

4. The header of claim 2, wherein the swath gate comprises a gate surface and the spreader and the converger are both coupled to the gate surface.

5. The header of claim 1, wherein the at least one roll comprises a first roll and a second roll spaced from the first roll to define a crop flow gap therebetween, the first roll comprising a surface defining a closest point to the second roll and a tangent line extending through the closest point that extends through the spreader when the swath gate is in the spreading position and through the converger when the swath gate is in the converging position.

6. The header of claim 5, wherein the tangent line does not extend through the spreader when the swath gate is in the converging position and does not extend through the converger when the swath gate is in the spreading position.

7. The header of claim 5, wherein the first roll and the second roll each comprise a cylindrical roll.

8. The header of claim 1, wherein the spreader comprises a wedge comprising an entry and an exit disposed rearwardly from the entry, the entry defining an entry width and the exit defining an exit width that is greater than the entry width.

9. The header of claim 1, wherein the converger comprises at least one fin comprising a front edge and a rear edge, the at least one fin being directed toward the centerline of the swath gate in a direction from the front edge to the rear edge.

10. An agricultural vehicle, comprising:
a chassis; and
a header carried by the chassis, the header comprising:
 a header frame;
 a cutter carried by the header frame and configured to cut crop material;
 at least one roll disposed rearwardly of the cutter and configured to convey cut crop material rearwardly in a crop flow stream;
 a swath gate coupled to the header frame and movable between a spreading position and a converging position, wherein the swath gate comprises a plate having a front edge and a rear edge, wherein the rear edge is elevated in the converging position relative to the spreading position;
 a spreader coupled to the swath gate and configured to laterally spread the crop flow stream as the crop flow stream flows across the spreader, the spreader being in the crop flow stream when the swath gate is in the spreading position and out of the crop flow stream when the swath gate is in the converging position; and
 a converger coupled to the swath gate and configured to converge the crop flow stream toward a centerline of the swath gate as the crop flow stream flows across the converger, the converger being in the crop flow stream when the swath gate is in the converging position and out of the crop flow stream when the swath gate is in the spreading position,
wherein the spreader and the converger both move together with the swath gate between the spreading position and the converging position.

11. The agricultural vehicle of claim 10, wherein the spreader and the converger are both carried by the swath gate.

12. The agricultural vehicle of claim 11, wherein the converger is disposed rearwardly of the spreader.

13. The agricultural vehicle of claim 11, wherein the swath gate comprises a gate surface and the spreader and the converger are both coupled to the gate surface.

14. The agricultural vehicle of claim 10, wherein the at least one roll comprises a first roll and a second roll spaced from the first roll to define a crop flow gap therebetween, the first roll comprising a surface defining a closest point to the second roll and a tangent line extending through the closest point that extends through the spreader when the swath gate is in the spreading position and through the converger when the swath gate is in the converging position.

15. The agricultural vehicle of claim 14, wherein the tangent line does not extend through the spreader when the swath gate is in the converging position and does not extend through the converger when the swath gate is in the spreading position.

16. The agricultural vehicle of claim 14, wherein the first roll and the second roll each comprise a cylindrical roll.

17. The agricultural vehicle of claim 10, wherein the spreader comprises a wedge comprising an entry and an exit disposed rearwardly from the entry, the entry defining an entry width and the exit defining an exit width that is greater than the entry width.

18. The agricultural vehicle of claim 10, wherein the converger comprises at least one fin comprising a front edge and a rear edge, the at least one fin being directed toward the centerline of the swath gate in a direction from the front edge to the rear edge.

19. The header of claim 1, wherein the swath gate is pivotably coupled to the header frame by a lever.

20. The header of claim 1, wherein the swath gate is coupled to the header frame at a pivot point, wherein the spreader is positioned closer to the pivot point than the converger, and wherein the spreader and the converger move into and out of engagement with the crop flow stream by moving the swath gate.

\* \* \* \* \*